United States Patent
Allen-Ware et al.

(10) Patent No.: US 9,477,568 B2
(45) Date of Patent: Oct. 25, 2016

(54) MANAGING INTERCONNECT ELECTROMIGRATION EFFECTS

(71) Applicant: International Business Machines Corporation, Armonk, NY (US)

(72) Inventors: Malcolm S. Allen-Ware, Austin, TX (US); Jon A. Casey, Pooghkeepsie, NY (US); Sungjun Chun, Austin, TX (US); Alan J. Drake, Round Rock, TX (US); Charles R. Lefurgy, Austin, TX (US); Karthick Rajamani, Austin, TX (US); Jeonghee Shin, Millwood, NY (US); Thomas A. Wassick, LaGrangeville, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 14/039,047

(22) Filed: Sep. 27, 2013

(65) Prior Publication Data
US 2015/0094995 A1 Apr. 2, 2015

(51) Int. Cl.
*G06F 17/50* (2006.01)
*G06F 11/30* (2006.01)
(Continued)

(52) U.S. Cl.
CPC ....... *G06F 11/3006* (2013.01); *G06F 11/0703* (2013.01); *G06F 11/3027* (2013.01); *G06F 11/3058* (2013.01); *G06F 11/3093* (2013.01); *G06F 11/004* (2013.01)

(58) Field of Classification Search
CPC ............. G06F 11/3006; G06F 11/004; G06F 11/0703; G06F 11/3027; G06F 11/3058; G06F 11/3093
See application file for complete search history.

(56) References Cited

U.S. PATENT DOCUMENTS

| 3,750,004 A | 7/1973 | Walker |
| 4,127,885 A | 11/1978 | Adam et al. |

(Continued)

FOREIGN PATENT DOCUMENTS

| JP | 10-066359 | 3/1998 |
| JP | 2001-238434 | 8/2001 |
| WO | WO2005/017468 A2 | 2/2005 |

OTHER PUBLICATIONS

E.S. Kuh et al. "The state-variable approach to network analysis," 1965, Proceeding of the IEEE, vol. 53, issue 7, pp. 672-686.*

(Continued)

*Primary Examiner* — Aniss Chad
*Assistant Examiner* — Russ Guill
(74) *Attorney, Agent, or Firm* — Francis Lammes; Stephen J. Walder, Jr.; Parashos T. Kalaitzis (57) ABSTRACT

A mechanism is provided for determining a modeled age of a set of interconnect groups in a set of cores in a set of multi-core processors. For each interconnect group in the set of interconnect groups in the set of cores on the set of multi-core processors, a determination is made of a current modeled age of the interconnect group. A determination is then made as to whether at least one current modeled age of the interconnect group for the set of interconnect groups is greater than an end-of-life value. Responsive to at least one current modeled age of the interconnect group being greater than the end-of-life value, an indication to take corrective action with the at least one associated interconnect group is sent.

18 Claims, 3 Drawing Sheets

(51) Int. Cl.
*G06F 11/07* (2006.01)
*G06F 11/00* (2006.01)

(56) References Cited

U.S. PATENT DOCUMENTS

| | | | |
|---|---|---|---|
| 4,835,649 | A | 5/1989 | Salerno |
| 5,268,631 | A | 12/1993 | Gorman et al. |
| 5,581,475 | A | 12/1996 | Majors |
| 6,163,712 | A | 12/2000 | Winkler et al. |
| 6,390,379 | B1 | 5/2002 | Huang |
| 6,532,570 | B1 | 3/2003 | Mau |
| 6,643,128 | B2 | 11/2003 | Chu et al. |
| 6,775,624 | B2 * | 8/2004 | Storino ............... G06Q 30/02 702/34 |
| 6,836,100 | B2 | 12/2004 | Egan et al. |
| 6,959,258 | B2 | 10/2005 | Smith et al. |
| 7,000,204 | B2 | 2/2006 | McGuffin et al. |
| 7,050,871 | B2 | 5/2006 | Bartley et al. |
| 7,131,096 | B1 | 10/2006 | Balsdon et al. |
| 7,167,015 | B2 | 1/2007 | Borkar |
| 7,203,629 | B2 | 4/2007 | Ozis et al. |
| 7,257,796 | B2 | 8/2007 | Miller et al. |
| 7,370,303 | B2 | 5/2008 | Einspenner et al. |
| 7,424,806 | B2 | 9/2008 | Tien et al. |
| 7,447,602 | B1 | 11/2008 | Bradley et al. |
| 7,487,371 | B2 | 2/2009 | Simeral et al. |
| 7,495,519 | B2 | 2/2009 | Kim et al. |
| 7,530,040 | B1 | 5/2009 | Balsdon et al. |
| 7,659,622 | B2 | 2/2010 | Dauksher et al. |
| 7,710,131 | B1 | 5/2010 | Tiernan |
| 7,719,302 | B2 | 5/2010 | Hsu et al. |
| 7,721,245 | B2 | 5/2010 | Maziasz et al. |
| 7,784,010 | B1 | 8/2010 | Balsdon et al. |
| 7,793,239 | B2 | 9/2010 | Engel et al. |
| 7,797,654 | B2 | 9/2010 | Tai et al. |
| 7,805,689 | B2 | 9/2010 | Ueda et al. |
| 7,917,772 | B1 | 3/2011 | Koniaris et al. |
| 7,941,779 | B2 | 5/2011 | Rahmat et al. |
| 8,053,748 | B2 | 11/2011 | Shah et al. |
| 8,086,978 | B2 | 12/2011 | Zhang et al. |
| 8,089,743 | B2 | 1/2012 | Jian |
| 8,127,157 | B2 | 2/2012 | Bilak |
| 8,181,147 | B2 | 5/2012 | Tang et al. |
| 8,201,038 | B2 | 6/2012 | Graas et al. |
| 8,214,663 | B2 | 7/2012 | Floyd et al. |
| 8,260,708 | B2 | 9/2012 | Potkonjak |
| 8,332,074 | B2 | 12/2012 | Lee |
| 8,532,826 | B2 | 9/2013 | Moss et al. |
| 8,543,843 | B1 | 9/2013 | Cheng et al. |
| 8,671,290 | B2 | 3/2014 | Hsu |
| 8,713,490 | B1 * | 4/2014 | Allen-Ware ........ G06F 17/5009 700/108 |
| 2002/0019870 | A1 | 2/2002 | Chirashnya et al. |
| 2003/0014226 | A1 * | 1/2003 | Loecher ............... G06Q 10/06 703/2 |
| 2004/0059694 | A1 * | 3/2004 | Darken ................ G06Q 10/10 706/21 |
| 2004/0078634 | A1 | 4/2004 | Gilstrap et al. |
| 2004/0181363 | A1 * | 9/2004 | Marbot .................... G01K 3/04 702/181 |
| 2004/0206101 | A1 | 10/2004 | Bash et al. |
| 2005/0085960 | A1 | 4/2005 | Lumbis et al. |
| 2005/0273208 | A1 | 12/2005 | Yazawa et al. |
| 2006/0052970 | A1 | 3/2006 | Arabi et al. |
| 2006/0178764 | A1 | 8/2006 | Bieswanger et al. |
| 2006/0282705 | A1 * | 12/2006 | Lopez ............. G01R 31/31717 714/27 |
| 2007/0088974 | A1 | 4/2007 | Chandwani et al. |
| 2008/0086708 | A1 | 4/2008 | Rittman |
| 2008/0140362 | A1 | 6/2008 | Gross et al. |
| 2008/0278905 | A1 | 11/2008 | Artman et al. |
| 2009/0076790 | A1 | 3/2009 | Fein et al. |
| 2009/0187869 | A1 * | 7/2009 | Jain ..................... G06F 17/5036 716/115 |
| 2009/0287909 | A1 * | 11/2009 | Vera ...................... G06F 11/008 712/220 |
| 2009/0296342 | A1 | 12/2009 | Matteson et al. |
| 2010/0038683 | A1 * | 2/2010 | Shanware ............ H01L 27/092 257/204 |
| 2010/0049995 | A1 | 2/2010 | Casey et al. |
| 2011/0173581 | A1 | 7/2011 | Koushanfer et al. |
| 2011/0219208 | A1 * | 9/2011 | Asaad ..................... G06F 15/76 712/12 |
| 2011/0231030 | A1 | 9/2011 | Carter et al. |
| 2012/0096424 | A1 * | 4/2012 | Burd .................. G06F 17/5036 716/136 |
| 2013/0305068 | A1 | 11/2013 | Jung |
| 2014/0201576 | A1 * | 7/2014 | Wu ...................... G06F 11/3058 714/47.2 |
| 2014/0244212 | A1 * | 8/2014 | Allen-Ware ....... G01R 31/2851 702/182 |

OTHER PUBLICATIONS

Jochen Von Hagen et al., "Extrapolation of highly accelerated electromigration tests on copper to operation conditions," 2002, IEEE International Integrated Reliability Workshop Final Report, pp. 41-44.*
"Method to Estimate Power at Test Conditions", IPCOM000211219D, ip.com, Sep. 28, 2011, 2 pages.
Wang, Xiaorui et al., "Adaptive Power Control with Online Model Estimation for Chip Multiprocessors", IEEE Transactions on Parallel and Distributed Systems, v. 22, No. 10, Oct. 2011, 15 pages.
International Search Report and Written Opinion dated Jan. 25, 2013 for International Application No. PCT/US2012/062919, 12 pages.
U.S. Appl. No. 13/288,346.
U.S. Appl. No. 13/608,285.
"Failure Mechanisms and Models for Semiconductor Devices", JEDEC Solid State Technology Association, JEP122G, Published Oct. 2011, Revision of JEP122F published Nov. 2010, 108 pages.
Loughmiller, Daniel R., "Quality and Reliability of Semiconductor Devices", Micron Group, Inc., http://www.ee.uidaho.edu/ee/classes/ee481f01/Micronrelib.pdf, retrieved Jan. 9, 2014, 19 pages.
"Semiconductor Device Reliability Verification", Sony, Semiconductor Quality and Reliability Handbook, Chapter 2, http://www.sony.net/Products/SC-HP/tec/catalog/pdf/chapter2e_201108.pdf, 2011, 32 pages.
Bickford, Jeanne P. et al., "In-Situ Computing System Failure Avoidance", U.S. Appl. No. 13/948,811, filed Jul. 23, 2013, 45 pages.
Black, James R., "Mass Transport of Aluminum by Momentum Exchange with Conducting Electrons", IEEE 05CH37616 43rd Annual International Reliability Physics Symposium, San Jose, California, 2005, reprinted from 6th Annual Reliability Physics Proceedings, Los Angeles, California, Nov. 6-8, 1967, 6 pages.
Blish, Richard et al., "Semiconductor Device Reliability Failure Models", International SEMATECH, Technology Transfer # 00053955A-XFR, May 31, 2000, 34 pages.
Covi, Kevin R. et al., "Implementing Dynamic Regulator Output Current Limiting", U.S. Appl. No. 13/764,858, filed Feb. 12, 2013, 22 pages.
Geiger, Randall L. et al., "Lifetime Electrothermal Stress Management for Multi-Core Systems", Iowa State University, Annual Review, http://www.src.org/library/publication/p056624/, Received Jun. 18, 2010, Last Edited Jun. 21, 2010, retrieved from the Internet Nov. 15, 2013, 68 pages.
Haberland, Julian et al., "Current Loadability of ICA for Flip Chip Applications", 4th Electronics Packaging Technology Conference, 2002, 6 pages.
Huang, Wei et al., "Accurate Fine-Grained Processor Power Proxies", MICRO-45, Dec. 2012, 11 pages.
Hutcheon, Graeme A. et al., "Remote Electromigration Monitoring of Electronic Chips", U.S. Appl. No. 13/804,657, filed Mar. 14, 2013, 24 pages.
Libby, Richard, "Effective HPC hardware management and Failure prediction strategy using IPMI", Proceedings of the Linux Symposium, 2003, 12 pages.

(56) References Cited

OTHER PUBLICATIONS

Logan, Sheldon et al., "Package-Chip Co-Design to Increase Flip-Chip C4 Reliability", 12th International Symposium on Quality Electronic Design, 2011, pp. 553-558.

Master, Raj N. et al., "Electromigration of C4 bumps in Ceramic and Organic Flip-Chip Packages", 2006 Electronic Components and Technology Conference, IEEE, 2006, pp. 646-649.

Nagaraj, Vishal, "Flip Chip Back End Design Parameters to Reduce Bump Electromigration", The University of Texas at Arlington, Aug. 2008, 60 pages.

Peng, Chih-Yang et al., "Simultaneous Block and I/O Buffer Floorplanning for Flip-Chip Design", Asia and South Pacific Conference in Design Automation, IEEE, Jan. 2006, pp. 213-218.

Todri, Aida et al., "Power Supply Noise Aware Workload Assignment for Multi-Core Systems", IEEE/ACM International Conference on Computer-Aided Design, 2008, 8 pages.

Vigrass, William J., "Calculation of Semiconductor Failure Rates", http://www.intersil.com/content/dam/Intersil/quality/rel/calculation_of_semiconductor_failure_rates.pdf, retrieved Jan. 9, 2014, 5 pages.

Wang, Zhikui et al., "Optimal Fan Speed Control for Thermal Management of Servers", Proceedings of the ASME/Pacific Rim Technical Conference and Exhibition on Packaging and Integration of Electronic and Photonic Systems, MEMS, and NEMS InterPACK'09, San Francisco, California, Jul. 19-23, 2009, 11 pages.

\* cited by examiner

MANAGING INTERCONNECT ELECTROMIGRATION EFFECTS

GOVERNMENT RIGHTS

This invention was made with Government support under DARPA, HR0011-13-C-0022. THE GOVERNMENT HAS CERTAIN RIGHTS IN THIS INVENTION.

BACKGROUND

The present application relates generally to an improved data processing apparatus and method and more specifically to mechanisms for managing interconnect electromigration effects.

Electromigration (EM) is a transport of material caused by a gradual movement of the ions in a conductor due to a momentum transfer between conducting electrons and diffusing metal atoms. The effect of EM is important in applications where high direct current densities are used, such as in microelectronics and related structures. As a structure size in electronics decreases, such as integrated circuits (ICs), the practical significance of the EM effect increases.

SUMMARY

In one illustrative embodiment, a method, in a data processing system, is provided for determining a modeled age of a set of interconnect groups in a set of cores in a set of multi-core processors. For each interconnect group in the set of interconnect groups in the set of cores on the set of multi-core processors, the illustrative embodiment determines a current modeled age of the interconnect group. The illustrative embodiment determines whether at least one current modeled age of the interconnect group for the set of interconnect groups is greater than an end-of-life value. The illustrative embodiment sends an indication to take corrective action with the at least one associated interconnect group in response to at least one current modeled age of the interconnect group being greater than the end-of-life value.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In integrated circuits (ICs), typically, a small number of interconnects drive greater than 90% of the electromigration (EM) risk sites due to localized "hotspots" beneath processing cores. Present EM testing assumes a "worst-case" scenario, such that all interconnects, such as C4 solder ball connections, are stressed at an average junction temperature (Tj) for the silicon where the connection is made. While some portions of the silicon may be hotter than others, there are likely some interconnects cooler than Tj and some interconnects hotter than Tj. However, the most stressed interconnects, i.e. the "hotspots," are likely to be in range of the Tj setting in current EM testing. Further, present EM testing assumes a single point of failure with no current sharing. That is, in present EM testing, all interconnects are assumed to use currents based on stressed worst case current carrying assumptions. However in reality, not all interconnects operate at the same temperature or use the same amount of current at any given time. Thus, product conditions at an individual interconnect level are not monitored and/or known. Therefore, the present practice of EM monitoring for temperature while not monitoring current at individual interconnects makes predicting a location of a "hotspot" early in the design phase difficult. Not knowing "hotspot" locations early in the design phase makes it difficult to integrate required current and/or temperature sensors needed to accurately measure EM effects.

Thus, the illustrative embodiments provide for managing interconnect electromigration effects through real-time monitoring of localized EM hotspot interconnects for temperature and current. Using this information, the illustrative embodiments estimate interconnect's field life time usage based on the measured EM effects. This estimated field life time usage is added to "call home" data that may be exposed to the user and/or administrator so that appropriate action may be taken. That is, if the estimated field life time usage indicates a local interconnect region that is close to an end-of-life, the customer and/or administrator may implement one or more corrective actions to manage the aging of the silicon in order to avoid early mortality of the silicon and improve the effective lifetime of the system. The one or more actions may include possible FRU replacement, active workload management to extend lifetimes of stressed out EM hotspots, or the like.

Figure 1:
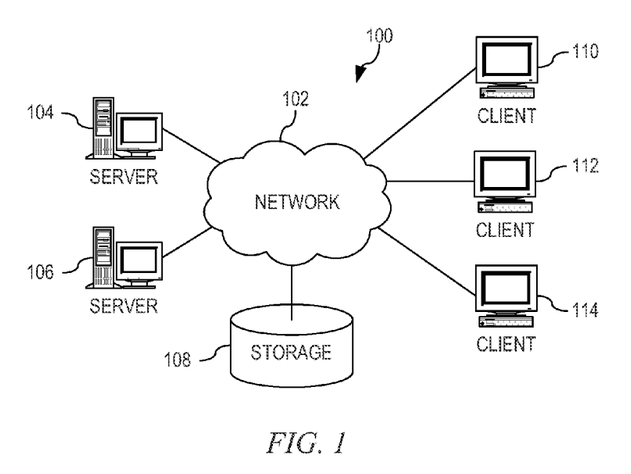
FIG. 1 is an example diagram of a distributed data processing system in which aspects of the illustrative embodiments may be implemented.
Figure 2:
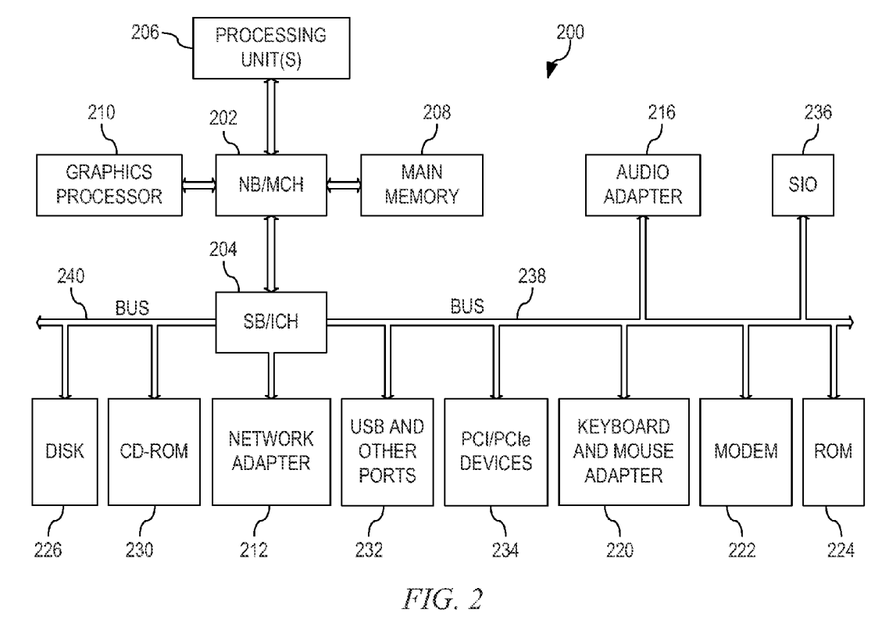
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
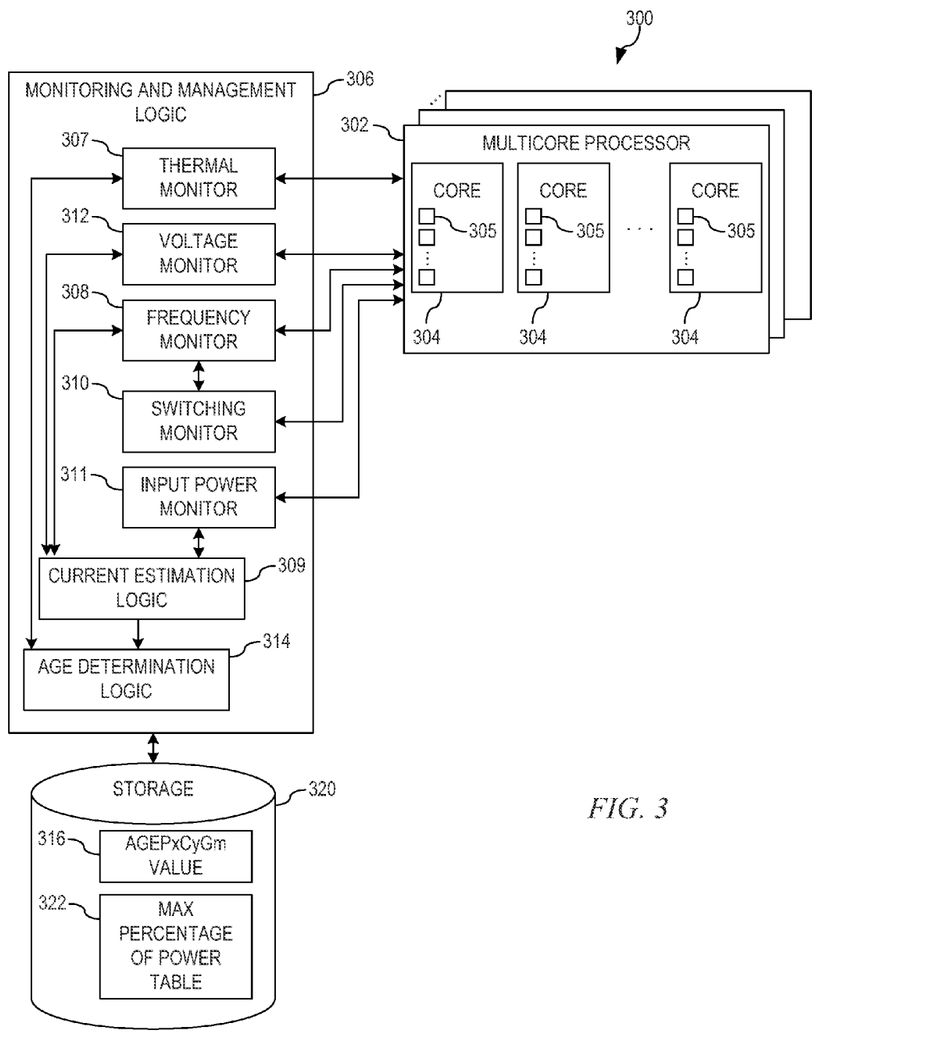
FIG. 3 depicts a functional block diagram of a mechanism for monitoring and managing run-time parameters of an integrated circuit to account for interconnect electromigration effects device in accordance with an illustrative embodiment.

Again, the illustrative embodiments utilize critical and measurable run-time operational parameters as input, such as total input current to a voltage regulator, the voltage regulator's output voltage, frequency, temperature, workloads, or the like on a fine time scale, to adopt more aggressive operational parameters for integrated circuit devices through monitoring and managing interconnect electromigration effects. FIG. 3 depicts a functional block diagram of a mechanism for monitoring and managing run-time parameters of an integrated circuit to account for interconnect electromigration effects device in accordance with an illustrative embodiment. Data processing system 300 comprises one or more multi-core processors 302 with each processor being comprised of one or more cores 304 and with each core comprising one or more groups of interconnects 305.

For each group of interconnects 305 in each core 304 in each multi-core processor 302, monitoring and management logic 306 measures run-time operational characteristics experienced by the silicon of core 304 with high precision. For example, the input current to the voltage regulator is measured with high precision at the higher voltage, e.g. 12 volts, and the output current is estimated based on the output voltage selection. For example, for each group of interconnects 305 in each core 304 in each multi-core processor 302, thermal monitoring logic 307 measures junction temperatures (T) via a digital thermal sensor with a +/−1% measurement error in degrees Kelvin at hot spots associated with the groups of interconnects 305. While the present example uses Kelvin as the basis for temperature measurement, the illustrative embodiments are not limited to using only temperature measurements in Kelvin. That is, any unit of measurement for temperature may be used, such as Fahrenheit, Celsius, or the like.

For each group of interconnects 305 in each core 304 in multi-core processor 302, frequency monitoring logic 308 measures operational frequencies (F) associated with the group of interconnects 305 via switching with a +/−0.05% measurement error in megahertz (MHz) on an upper bound even with active Dynamic Voltage and Frequency Scaling (DVFS). Furthermore, frequency monitoring logic 308 may augment the operation frequencies (F) via switching monitoring logic 310 that utilizes digital power proxies to weight the measured frequencies based on a predetermined importance of various components within core 304, thereby avoiding generic frequency values. Additionally, for each group of interconnects 305 in each core 304 in each multi-core processor 302, voltage monitoring logic 312 measures operation voltages (Vds) associated with the group of interconnects 305 with a +/−1% measurement error in volts on an upper bound (i.e., regulator setting) even with active Dynamic Voltage and Frequency Scaling (DVFS).

Current estimation logic 309 utilizes the measurements obtained by thermal monitoring logic 307, frequency monitoring logic 308 with or without switching monitoring logic 310, and voltage monitoring logic 312 to determine the present core current $I_{core}$ associated with a particular core 304 utilizing the following equation:

$$I_{core} = I_{12Volt}(V_{12Volt}/V_{ds}) * \text{regulator\_efficiency} * \left(\frac{\text{core\_share}}{\text{input\_power}}\right)$$

where $I_{12volt}$ is a measured 12 volt current using a current sensing device, $V_{12volt}$ is a measured 12 volt voltage into a voltage regulator measured using a resistor, Vds is an external voltage coming into the IC chip at the output of the voltage regulator, regulator efficiency is how much energy is lost in down converting the voltage, e.g. 0.85, and has to be characterized in the lab, core_share is a portion of the total power attributed to an individual cores activity (AC power) and thermally enhanced leakage power (DC power) which is a function of the temperature of the core, and input_power is the total input power to the multi-core processor 302 as determined by input power monitor 311.

Another common method for measuring the current consumed by the microprocessor is to integrate the voltage across the inductance at the output of the voltage regulator. The integrated voltage across the inductance is divided by the parasitic passive resistance of the inductor. The result of the division is the current consumed by the microprocessor.

With the core current $I_{core}$ determined, current estimation logic 309 accesses a maximum percentage of power table 322 that identifies a maximum percentage of power consumed by individual units within the core 304 under various workloads. For example, for six functional units within a core, an instruction sequencer unit (ISU) utilizes 27% of the power during a mload workload, a deblocking filter unit (DFU) utilizes 5% of the power during a mcopy workload, a fixed point execution unit (FXU) uses 7% of the power during a v107 workload, a floating point execution unit (FPU) utilizes 19% of the power during a vddot_dual workload, an instruction fetch unit (IFU) utilizes 77% of the power during a vddot_uni workload, and a load/store unit (LSU) utilizes 66% of the power during a daxpy workload.

With these maximum percentage of power values for the functional units within the core 304 determines a unit current ($I_{unit}$) for the various functional units using the following equation:

$$I_{unit} = \text{maximum\_percentage}_{unit} * I_{core}$$

While there are multiple ways to partition core logic into units, in the above example, the partitioning of the core in units follows the logic function. For example, ISU includes all logic transistors, clocking elements, register files and arrays that implement the logic function of the core responsible for checking inter instruction dependency, renaming registers, selecting instructions for issue to functional units, and computing logic conditions for completing instructions. Another way to partition the core into sub-components is to use the physical placement as a basis for partitioning. In this method, each unit may be defined by the X-Y coordinates of the bounding box or using a plurality of bounding boxes. The distribution of current by the unit depends on the workload running on the processor core, the data patterns processed by the workload, the core mode of execution, voltage, frequency, and temperature. Moreover, the distribution varies from chip to chip. In the preferred embodiment the current distribution is computed for the dynamic power (referred to as AC) and static power (referred to as DC) separately. The dynamic power (AC) is modeled as two components: workload dependent AC and workload independent AC. The accuracy of runtime AC current calculations may be significantly improved by separating the workload-independent AC components and computing the current contribution matrix of the workload independent components separately. Workload independent AC currents include clock distribution, local clock buffers and free-running latches and logic. Clock distribution currents are typically localized to the clock sector buffers driving the clock grid. The currents of the each clock sector buffer is typically delivered through a small group of C4s surrounding that clock sector buffer. In the preferred embodiments the power of clock sector buffers is treated as a separate unit.

Power proxies allow an accurate estimation of workload-dependent AC components. Power proxies are a weighted combination of AC events in a core where the weights are determined to give the smallest error representation of AC power in a core for a variety of representative workloads. Power proxies are used to scale the total measured input power across all the cores into individual weighted groups for each core. The actual manner that the power proxies are computed are not the subject of this invention disclosure claims. However, the higher the accuracy of estimating the power proxies for each core, the more accurate the C4 electromigration aging characteristic that is tracked.

The scaling of AC current with the voltage and frequency is modeled using the following equation:

$$AC\_current = frequency * C\_effective * voltage * \left(\frac{voltage}{voltage\_base}\right)^{voltage\_exponent}$$

where the voltage_base is a voltage at which the current distribution is initially computed, voltage_exponent is a technology dependent constant, and C_effective is a capacitance switched during each operation or during each clock cycle. The value of the technology-dependent voltage_exponent can be in the range of between 0 and 1.4.

The static power in processors implemented in CMOS technology is dominated by leakage currents. Leakage currents are typically measured as part of the standard manufacturing test called IDDQ test and saved in the EPROM memory, IDDQ. Leakage current map is generated using the leakage power modeling tools. Using the leakage current contribution matrix the leakage current contribution of each group of devices can be assigned to individual C4s. Leakage current is a function of voltage and temperature. Leakage currents during IDDQ test are typically measured at a single voltage and temperature point and the measurements conditions are also saved in EPROM (T_IDDQ and V_IDDQ). The preferred embodiment dynamically re-computes the leakage current on a per-core bases at every interval of operation, based on temperature and operating voltage at each interval (T(t) and V(t)) using the following equation:

$$Leakage\_current = IDDQ * (temperature\_sensitivity) \left(\frac{T(t) - T\_IDDQ}{T\_base}\right) * (V(t) - V\_IDDQ)^{voltage\_exponent}$$

where IDDQ is the leakage current, T_IDDQ is a temperature at the time the leakage current was identified, V_IDDQ is a voltage at the time the leakage current was identified, T(t) is a measured temperature at time t, V(t), is a measured voltage at time t, and temperature_sensitivity, T_base, and voltage_exponents are technology-dependent constants. In the preferred embodiment, the same values for the technology-dependent constants are used across all chips and are hard-coded in the EPROM or in the firmware as constants. Typical values are as follows: temperature_sensitivity=1.2, T_base=10° C. and voltage_exponents=3.0.

In another embodiment, the values technology-dependent constants are measured at the test time for each chip and saved in EPROM along with IDDQ values. In the preferred embodiment, the leakage current is re-computed on a per-core basis at every interval of operation. The leakage calculation is done once per interval, and the corresponding current contributions to individual C4s are computed once per the monitoring time interval. In another embodiment, the leakage currents are re-computed on a per-area basis. The temperature reading for each individual area is used for re-computing the leakage currents.

In yet another embodiment, the leakage currents are re-computed on a device group bases. The technology-dependent leakage sensitivity constants are stored individually for every group of devices. The contribution of leakage currents of each device group to individual C4s is recomputed using a current contribution matrix derived for each of the device groups. An example of device groups includes SRAM cells, low-threshold logic devices, high threshold logic devices, or the like. In a further embodiment, the NFETs and PFETs comprise individual groups. In yet another embodiment, the functional units comprise individual groups.

In order to obtain an estimate of the actual current associated with the interconnect groups associated with the functional units, current estimation logic 309 utilizes a matrix representing power distribution networks for interconnect current and sensitivity:

$$\begin{bmatrix} A_{00} & A_{01} & \ldots & A_{0m-1} \\ A_{10} & A_{11} & \ldots & A_{1m-1} \\ \ldots & \ldots & \ldots & \ldots \\ A_{n-10} & A_{n-11} & \ldots & A_{n-1m-1} \end{bmatrix} * \begin{bmatrix} I_{unit\_0} \\ I_{unit\_1} \\ \ldots \\ I_{unit\_m-1} \end{bmatrix} = \begin{bmatrix} I_{interconnect\_0} \\ I_{interconnect\_1} \\ \ldots \\ I_{interconnect\_n-1} \end{bmatrix}$$

In this matrix, the A values are pre-silicon analyzed values where the columns represent where source current goes and the rows represent where source current comes from. Age determination logic 314 utilizes the estimated interconnect current ($I_{interconnect}$)5 which may also be referred to as $J_{use}$ since it is an estimated value, and the measured temperature $T_{use}$ associated with each group of interconnects 305 to determine a real-time age of each group of interconnects 305.

Beginning at initialization of data processing system 300, age determination logic 314 determines a number of processors (X) in data processing system 300, a number of cores (Y) within each processor, and a number of groups of interconnects (M) within each core. Once age determination logic 314 determines the number of processors (X), the number of cores (Y), and the number of groups of interconnects (M), age determination logic 314 sets incrementing variables for interconnect groups (m), cores (y), and processors (x) to 0. For each combination of interconnects groups in the number of interconnect groups (M), cores in the number of cores (Y), and processors in the number of processors (X), age determination logic 314 also sets a set of modeled age variable $AGEP_xC_yG_m$ values 316 equal to 0. The modeled age variable $AGEP_xC_yG_m$ values 316 measures the modeled age of the actual silicon in microseconds, which is updated every interval (t). Thus, for example, if there are three interconnect groups, two cores, and two processors, there would be 12 unique modeled age variable $AGEP_xC_yG_m$ values 316 (AGE000, AGE100, AGE200, AGE010, AGE110, AGE210, AGE001, AGE101, AGE201, AGE011, AGE111, and AGE211). Therefore, for each combination of interconnect group, core, and processor, the corresponding $AGEP_xC_yG_m$ value 316 is maintained independently and distinctly without ever being intermixed.

With these variables set, for each combination of interconnect group, core, and processor during every interval (t), which is a predetermined time period, age determination logic 314 receives measurements from thermal monitoring logic 307 and current estimation logic 309, resulting in a present temperature ($T_{use}P_xC_yG_m$) and a present estimated current ($J_{use}P_xC_yG_m$) for a given interconnect group m. In accordance with the illustrative embodiments, age determination logic 314 may utilize either a peak value during the time interval (t) or an average value during the time interval (t) for each of temperature (TusePxCyGm) and estimated current ($J_{use}P_xC_yG_m$).

With the a present temperature ($T_{use}P_xC_yG_m$) and the present estimated current ($J_{use}P_xC_yG_m$) values for the given interconnect group m, age determination logic 314 computes an aging percentage or acceleration factor (AF) for interconnect group m for the last time interval t by first determining a statistical population of parts that have failed:

$$t_{50} = \left(\frac{A}{J^n}\right)e^{\frac{\Delta h}{kT}}$$

where $t_{50}$ is 50% of a statistical population of parts that have failed, A is a constant based on the cross-sectional area of the interconnect, J is either $J_{use}$ (present estimated current) or $J_{stress}$ (stress current), n is a current density exponent (typically, 1.5–2), $\Delta h$ is an activation energy (typically, 0.7–1 eV), k is Boltzman's constant, and T is the current temperature value in degrees Kelvin. Age determination logic 314 then determines the aging percentage or acceleration factor AF for interconnect group m using Black's equation:

$$AF = \frac{t_{50u}}{t_{50s}} = \frac{\left(\frac{1}{J_{use}^n}\right)e^{\frac{-h}{kT_u}}}{\left(\frac{1}{J_{stress}^n}\right)e^{\frac{-h}{kT_u}}}$$

$$AF = \left(\frac{J_{stress}}{J_{use}}\right)^n e^{\left[\left(\frac{h}{k}\right)*\left(\frac{1}{T_{use}} - \frac{1}{T_{stress}}\right)\right]}$$

$$AF = \left(\frac{J_{stress}}{J_{use}}\right)^n e^{\left[\left(\frac{E_a}{k}\right)*\left(\frac{1}{T_{use}} - \frac{1}{T_{stress}}\right)\right]}$$

where $t_{50u}$ is 50% of a present statistical population of parts that have failed, $t_{50s}$ is 50% of a stressed statistical population of parts that have failed $J_{use}$ is a present estimated current actually being drawn in practice, $J_{stress}$ is an assumed current at maximum stress determined during burn-in testing, n is a current density exponent (typically, 1.5–2), h is an activation energy (typically, 0.7–1 eV), k is Boltzmann's constant, $T_{use}$ is a present temperature value in degrees Kelvin, $T_{stress}$ is the stress temperature value in degrees Kelvin determined during burn-in testing, and Ea is an activation energy (typically 0.7 to 1.0 eV). Thus, age determination logic 314 determines the acceleration factor (AF) by comparing the stress test conditions determined during burn-in testing to present test conditions.

With the aging percentage or acceleration factor (AF) determined, age determination logic 314 increases the corresponding modeled age variable $AGEP_xC_yG_m$ value 316 in storage 320 for the group of interconnects by adding the aging percentage or acceleration factor (AF) value to the current modeled age variable $AGEP_xC_yG_m$ value as follows:

$$AGEP_xC_yG_m = AGEP_xC_yG_m + AF(t).$$

Age determination logic 314 then increases the interconnect group variable m by 1 as follows:

$$m = m+1,$$

to evaluate a next interconnect group m. Age determination logic 314 then determines whether the current value of the interconnect group variable m is greater than or equal to the number of interconnect groups (M).

If age determination logic 314 determines that the current value of the interconnect group variable m is less than the number of interconnect groups (M), then age determination logic 314 computes a new aging percentage or acceleration factor (AF) for a next interconnect group m using a present temperature ($T_{use}P_xC_yG_m$) and a present estimated current ($J_{use}P_xC_yG_m$) for that interconnect group m. Age determination logic 314 then repeats the process for each of the number of interconnect groups (M). If age determination logic 314 determines that the current value of the interconnect group variable m is greater than or equal to the number of interconnect groups (M), then age determination logic 314 increases the core variable y by 1 as follows:

$$y = y+1,$$

which moves to evaluate all interconnect groups M associated with the next core y. Age determination logic 314 then determines whether the current value of the core variable y is greater than or equal to the number of cores (Y) of the current processor x. If age determination logic 314 determines that the current value of the core variable y is less than the number of cores (Y) of the current processor x, then age determination logic 314 sets the interconnect group variable m equal to 0 and computes a new present temperature ($T_{use}P_xC_yG_m$) and a new present estimated current ($J_{use}P_xC_yG_m$) for the present interconnect group m and present core y. Age determination logic 314 then repeats the process for each of the cores (Y) and for each of the interconnect groups (M) in the present processor x.

If age determination logic 314 determines that the current value of the core variable y is greater than or equal to the number of cores (Y) for the current processor x, then age determination logic 314 increases the processor variable x by 1 as follows:

$$x = x+1,$$

which changes to the next processor x. Age determination logic 314 then determines whether the current value of the processor variable x is greater than or equal to the number of processors (X). If age determination logic 314 determines that the current value of the processor variable x is less than the number of processors (X), then age determination logic 314 sets the core variable y equal to 0, sets the interconnect group variable m equal to 0, and computes a new present temperature ($T_{use}P_xC_yG_m$) and a new present estimated current ($J_{use}P_xC_yG_m$) for the present interconnect group m and present core y, thereby repeating the process for the next processor in the number of processors (X), for each of the number of cores (C) and for each of the number of interconnect groups (M).

If age determination logic 314 determines that the current value of the processor variable x is greater than or equal to the number of processors (X), then age determination logic 314 determines whether the maximum of the modeled age variable $AGEP_xC_yG_m$ values for the interconnect groups 305 in cores 304 on processors 302 is greater than an end-of-life value for the interconnect groups 305 in cores 304 on multi-core processors 302 minus an epsilon value. That is, the manufacturer of multi-core processors 302 provides an end-of-life value for the interconnect groups 305 in cores 304 on multi-core processor 302. Additionally, enterprises provide a maintenance time frame (epsilon) for replacement of components within a data processing system, such as data processing system 300. Thus, age determination logic 314 determines whether the maximum of the modeled age variable $AGEP_xC_yG_m$ values 316 for the interconnect groups 305 in cores 304 on multi-core processors 302 is greater than the end-of-life value for the interconnect groups 305 in cores 304 on multi-core processors 302 minus the epsilon value.

If age determination logic 314 determines that the maximum of the modeled age variable $AGEP_xC_yG_m$ values 316 for the interconnect groups 305 in cores 304 on multi-core processors 302 are less than or equal to the end-of-life value for the interconnect groups 305 in cores 304 on multi-core processors 302 minus the epsilon value, then age determination logic 314 waits one interval t and then sets the interconnect variable m equal to 0, sets the core variable y equal to 0, and sets the processor variable x equal to 0. Age determination logic 314 then starts the process over for each interconnect group in the number of interconnect groups (M), for each core in the number of cores (Y) and for each processor in the number of processors (X) until the maximum of the modeled age variable $AGEP_xC_yG_m$ values 316 for the interconnect groups 305 in cores 304 on multi-core processors 302 is greater than the end-of-life value for the interconnect groups 305 in cores 304 on multi-core processors 302 minus the epsilon value. Once age determination logic 314 determines that the maximum of the modeled age variable $AGEP_xC_yG_m$ values 316 for the interconnect groups 305 in cores 304 on multi-core processors 302 is greater than the end-of-life value for the interconnect groups 305 in cores 304 on multi-core processors 302 minus the epsilon value, age determination logic 314 sends an indication to an administrator that the multi-core processor requires replacing.

Thus, age determination logic 314 tracks each critical interconnect group 305 or all interconnect groups 305 associated with a core 304 independently over the life time of the product and treats each critical interconnect group 305 or all interconnect groups 305 associated with a core 304 independently. At every time interval (t), age determination logic 314 chooses whichever interconnect group 305's age is currently showing the most aging for a corrective action to be taken, such as possible FRU replacement, active workload management to extend lifetimes of stressed out EM hotspots, or the like.

While the aged fraction or percent of lifetime metric is a good representation of the state of the system, an additional estimate may be made by calculating an equivalent failure in test (FIT) rate from the aging data. The FIT rate calculation involves analyzing the specifics of the log normal failure distribution from accelerated stress testing, which would complicate a direct calculation within the elements available in practice for real time monitoring. A good estimate, however, would come from the following:

calculate offline the expected FIT rate using a full lifetime, the expected current and temperature distributions, and the normal EM methodology;
 multiply that total FIT rate by the modeled age of the interconnect group calculated by age determination logic 314; and
 establish a rationale upper bound to the FIT rate equivalent of the EM age.

For example, an estimated FIT rate for a module is determined to be 15 packages per 10,000 for 60,000 power-on-hours. In the field, age determination logic 314 determines the current percent of age actually reached 4%, then the effective FIT rate is 0.04*15=0.6 failure per 10,000 packages for 60,000 power-on-hours, which is less that 1 module. The estimated FIT rate provides real-time wear-out in terms of a failure in test, which is a parameter end-users may be more familiar with. The estimated FIT rate allows a user to determine whether the part has aged to the expected wear-out level or exceeded the wear-out level. The estimated FIT rate does not indicate whether this particular part will be the one that fails, only that the particular part has hit an expected lifetime that produces the estimated FIT rate.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
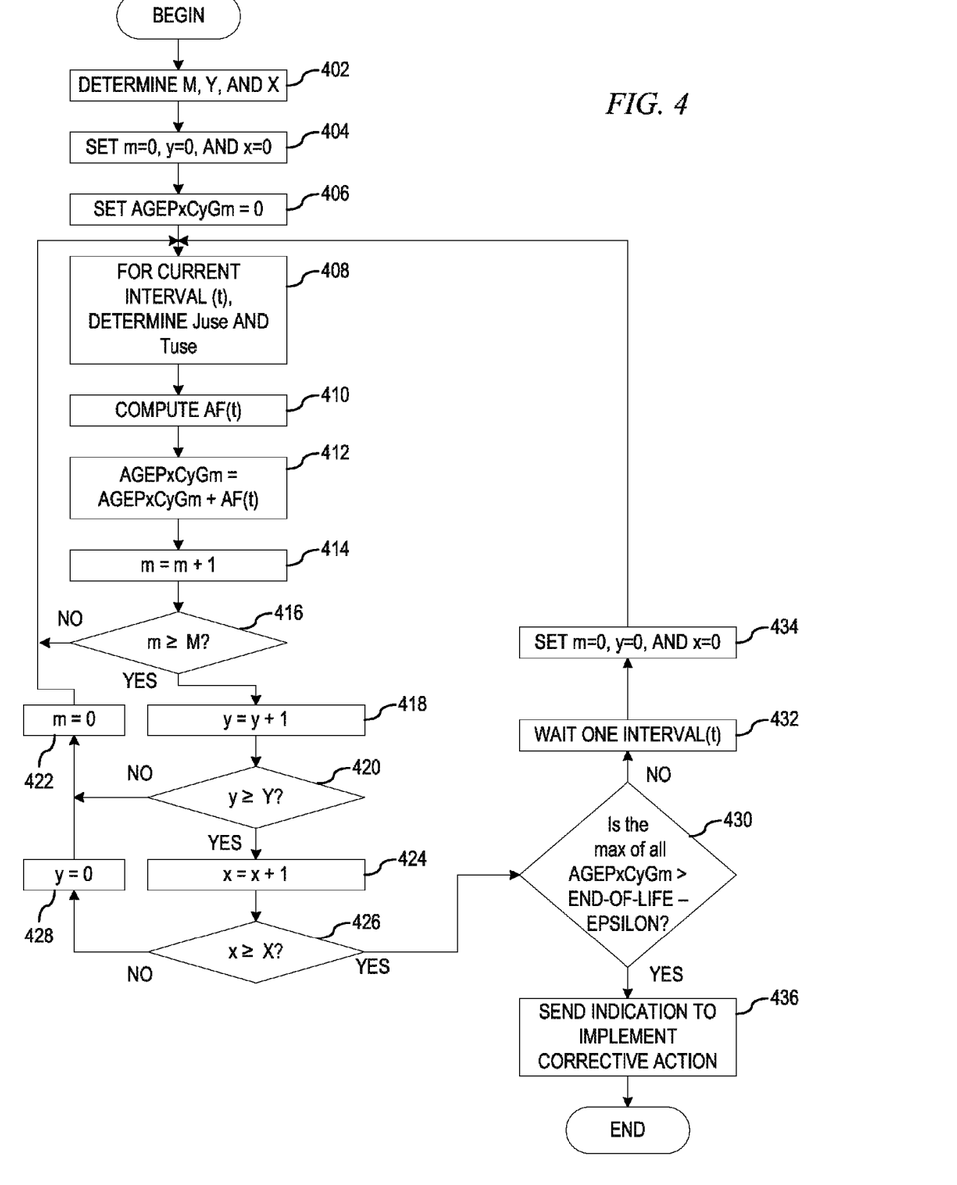
FIG. 4 depicts the operation performed in determining a modeled age of an interconnect group in a core on a multi-core processor in accordance with an illustrative embodiment.

FIG. 4 depicts the operation performed in determining a modeled age of an interconnect group in a core on a multi-core processor in accordance with an illustrative embodiment. As the operation begins, age determination logic, executed by a processor, determines a number of processors (X) in data processing system 300, a number of cores (Y) within each processor, and a number of groups of interconnects (M) within each core (step 402). The age determination logic then sets incrementing variables for interconnect groups (m), cores (y), and processors (x) to an initial value (step 404). The age determination logic also sets a set of modeled age variables $AGEP_xC_yG_m$ equal to an initial value (step 406). For each combination of interconnect group, core, and processor, one $AGEP_xC_yG_m$ value set to 0.

For a first of an interconnect group m, core y, and processor x during a first time interval (t), which is a predetermined time period, the age determination logic determines an estimated interconnect current ($J_{use}$) and a present temperature for the interconnect group ($T_{use}$) (step 408). The age determination logic computes an aging percentage or acceleration factor (AF) for interconnect group m (step 410). With the aging percentage or acceleration factor (AF) determined, the age determination logic increases the modeled age variable $AGEP_xC_yG_m$ value for the interconnect group by adding the determined aging percentage or acceleration factor (AF) to the current modeled age variable $AGEP_xC_yG_m$ value (step 412) as follows:

$$AGEP_xC_yG_m = AGEP_xC_yG_m + AF(t).$$

The age determination logic then increases the interconnect group variable m by 1 (step 414) as follows:

$$m = m+1,$$

to evaluate a model equation for the next interconnect group. The age determination logic then determines whether the current value of the interconnect group variable m is greater than or equal to the number of interconnect groups (M) (step 416).

If at step 416 the age determination logic determines that the current value of the interconnect group variable m is less than the number of interconnect groups (M), then the operation returns to step 408. If at step 416 the age determination logic determines that the current value of the interconnect group variable m is greater than or equal to the number of interconnect groups (M), then the age determination logic increases the core variable y by 1 (step 418) as follows:

$$y = y+1,$$

which moves to evaluate all interconnect groups associated with the next core. The age determination logic then determines whether the current value of the core variable y is greater than or equal to the number of cores (Y) (step 420). If at step 420 the age determination logic determines that the current value of the core variable y is less than the number of cores (Y), then the age determination logic sets the interconnect group variable m equal to the initial value (step 422), with the operation proceeding to step 408 thereafter.

If at step 420 the age determination logic determines that the current value of the core variable y is greater than or equal to the number of cores (Y), then the age determination logic increases the processor variable x by 1 (step 424) as follows:

$$x=x+1,$$

which changes to the next processor's cores and interconnect groups. The age determination logic then determines whether the current value of the processor variable x is greater than or equal to the number of processors (X) (step 426). If at step 426 the age determination logic determines that the current value of the processor variable x is less than the number of processors (X), then the age determination logic sets the core variable y equal to the initial value (step 428), with the operation proceeding to step 422 thereafter.

If at step 426 the age determination logic determines that the current value of the processor variable x is greater than or equal to the number of processors (X), then the age determination logic determines, for all the interconnect groups, whether a maximum of the modeled age variable $AGEP_xC_yG_m$ values for the interconnect groups in the cores on the multi-core processors is greater than an end-of-life value for the interconnect groups in the cores on the multi-core processors minus an epsilon value (step 430). That is, the manufacturer of the multi-core processor provides an end-of-life value for the interconnect groups in the cores on the multi-core processors. Additionally, enterprises provide a maintenance time frame (epsilon) for replacement of components within a data processing system. Thus, the age determination logic determines whether the modeled age variable $AGEP_xC_yG_m$ value for the interconnect groups in the cores on the multi-core processors is greater than the end-of-life value for the interconnect groups in the cores on the multi-core processors minus the epsilon value.

If at step 430 the age determination logic determines that the maximum of the modeled age variable $AGEP_xC_yG_m$ values for the interconnect groups in the cores on the multi-core processors is less than or equal to the end-of-life value for the interconnect groups in the cores on the multi-core processors minus the epsilon value, then the age determination logic waits one time interval t (step 432) and then sets the interconnect group variable m equal to the initial value, sets the core variable y equal to the initial value, and sets the processor variable x equal to the initial value (step 434), with the operation proceeding to step 408 thereafter. If at step 430 age determination logic determines that the maximum of the modeled age variable $AGEP_xC_yG_m$ values for the interconnect groups in the cores on the multi-core processors is greater than the end-of-life value for the interconnect groups in the cores on the multi-core processors minus the epsilon value, the age determination logic sends an indication to a consumer or an administrator to implement a corrective action (step 436), with the operation terminating thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for managing interconnect electromigration effects through real-time monitoring of localized EM hotspot interconnects for temperature and current. Using this information, the illustrative embodiments estimate interconnects' field life time usage based on the measured EM effects. This estimated field life time usage is added to "call home" data that may be exposed to the user and/or administrator so that appropriate action may be taken. That is, if the estimated field life time usage indicates a local interconnect region that is close to an end-of-life, the customer and/or administrator may implement one or more actions to manage the aging of the silicon in order to avoid early mortality of the silicon and improve the effective lifetime of the system. The one or more actions may include, possible FRU replacement, active workload management to extend lifetimes of stressed out EM hotspots, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining a modeled age of a set of interconnect groups in a set of cores in a set of multi-core processors, the method comprising:

for each interconnect group in the set of interconnect groups in the set of cores on the set of multi-core processors, determining a current modeled age of the interconnect group, wherein determining the current modeled age of the interconnect group comprises:

for each interconnect group in the set of interconnect groups, each core in the set of cores, and each processor in the set of multi-core processors, computing an aging percentage value utilizing a temperature associated with the interconnect group and a current associated with the interconnect group at regular intervals, wherein the aging percentage value is computed for each interconnect group by numerically solving Black's equation, wherein current in Black's equation is substituted with an estimated current associated with the interconnect group, wherein temperature in Black's equation is substituted with a measured or an estimated temperature for the interconnect group, and wherein the estimated current associated with the interconnect is computed by numerically multiplying a current contribution matrix by a vector of numerical values of currents of core components; and increasing the current value for the modeled age of interconnect group by the aging percentage value;

determining whether at least one current modeled age of the interconnect group for the set of interconnect groups is greater than an end-of-life value; and responsive to at least one current modeled age of the interconnect group being greater than the end-of-life value, sending an indication to take corrective action with the at least one associated interconnect group such that at least one of the multi-core processor associated with the at least one interconnect group is replaced or workload associated with the core or the multi-core processor associated with the at least one interconnect group is managed.

2. The method of claim 1, further comprising:

responsive to none of the current modeled age of the interconnect group for the set of interconnect groups being greater than or equal to the end-of-life value, repeating the process to calculate a new modeled age for each of the set of interconnect groups;

determining whether at least one of the new modeled age of the interconnect group for the set of interconnect groups is greater than the end-of-life value; and responsive to at least one new modeled age of the interconnect group being greater than the end-of-life value, sending the indication to take corrective action with the at least one associated interconnect group.

3. The method of claim 1, wherein the numerical values of the currents of core components are computed by multiplying a total current consumption of processors measured at a voltage regulator that are scaled by a ratio of total cores to a number of the running cores, by a numerically computed contribution of each of the core components to a total current consumed by each core.

4. The method of claim 3, wherein the numerically computed contribution of each of the core components to the total current consumed by each core is computed using a pre-silicon power analysis of the distribution of dynamic and static currents, wherein the dynamic and static current components are scaled to a voltage, frequency, and temperature of the running cores, and wherein the leakage current component is further multiplied by the IDDQ current measurements for each individual processor chip.

5. The method of claim 1, wherein the current contribution matrix is computed based on pre-silicon simulation of a processor power grid with current sources at specified locations, and wherein the current contribution matrix is computed for both static currents and dynamic currents.

6. The method of claim 1, further comprising:

computing a failure in test (FIT) rate based upon the current modeled age of the interconnect group.

7. A computer program product comprising a non-transitory computer readable storage medium having a computer readable program stored therein, wherein the computer readable program, when executed on a computing device, causes the computing device to:

for each interconnect group in a set of interconnect groups in a set of cores on a set of multi-core processors, determine a current modeled age of the interconnect group, wherein the computer readable program to determine the current modeled age of the interconnect group further causes the computing device to:

for each interconnect group in the set of interconnect groups, each core in the set of cores, and each processor in the set of processors, compute an aging percentage value utilizing a temperature associated with the interconnect group and a current associated with the interconnect group at regular intervals, wherein the aging percentage value is computed for each interconnect group by numerically solving Black's equation, wherein current in Black's equation is substituted with an estimated current associated with the interconnect group, wherein temperature in Black's equation is substituted with a measured or an estimated temperature for the interconnect group, and wherein the estimated current associated with the interconnect group is computed by numerically multiplying a current contribution matrix by a vector of numerical values of currents of core components; and increase the current value for the modeled age of the interconnect group by the aging percentage value;

determine whether at least one current modeled age of the interconnect group for the set of interconnect groups is greater than an end-of-life value; and responsive to at least one current modeled age of the interconnect group being greater than the end-of-life value, send an indication to take corrective action with the at least one associated interconnect group such that at least one of the multi-core processor associated with the at least one interconnect out is replaced or workload associated with the core or the multi-core processor associated with the at least one interconnect group is managed.

8. The computer program product of claim 7, wherein the computer readable program further causes the computing device to:

responsive to none of the current modeled age of the interconnect group for the set of interconnect groups being greater than or equal to the end-of-life value, repeat the process to calculate a new modeled age for each of the set of interconnect groups;

determine whether at least one of the new modeled age of the interconnect group for the set of interconnect groups is greater than the end-of-life value; and responsive to at least one new modeled age of the interconnect group being greater than the end-of-life value, send the indication to take corrective action with the at least one associated interconnect group.

9. The computer program product of claim 7, wherein the numerical values of the currents of core components are computed by multiplying a total current consumption of processors measured at a voltage regulator that are scaled by a ratio of total cores to a number of the running cores, by a numerically computed contribution of each of the core components to a total current consumed by each core.

10. The computer program product of claim 9, wherein the numerically computed contribution of each of the core components to the total current consumed by each core is computed using a pre-silicon power analysis of the distribution of dynamic and static currents, wherein the dynamic and static current components are scaled to a voltage, frequency, and temperature of the running cores, and wherein the leakage current component is further multiplied by the IDDQ current measurements for each individual processor chip.

11. The computer program product of claim 7, wherein the current contribution matrix is computed based on pre-silicon simulation of a processor power grid with current sources at specified locations, and wherein the current contribution matrix is computed for both static currents and dynamic currents.

12. The computer program product of claim 7, wherein the computer readable program further causes the computing device to:

compute a failure in test (FIT) rate based upon the current modeled age of the interconnect group.

13. An apparatus comprising:

a processor; and a memory coupled to the processor, wherein the memory comprises instructions which, when executed by the processor, cause the processor to:

for each interconnect group in a set of interconnect groups in a set of cores on a set of multi-core processors, determine a current modeled age of the interconnect group, wherein the instructions to determine the current modeled age of the interconnect group further cause the processor to:

for each interconnect group in the set of interconnect groups, each core in the set of cores, and each processor in the set of processors, compute an aging percentage value utilizing a temperature associated with the interconnect group and a current associated with the interconnect group at regular intervals, wherein the aging percentage value is computed for each interconnect group by numerically solving Black's equation, wherein current in Black's equation is substituted with an estimated current associated with the interconnect group, wherein temperature in Black's equation is substituted with a measured or an estimated temperature for the interconnect group, and wherein the estimated current associated with the interconnect group is computed by numerically multiplying a current contribution matrix by a vector of numerical values of currents of core components; and increase the current value for the modeled age of the interconnect group by the aging percentage value;

determine whether at least one current modeled age of the interconnect group for the set of interconnect groups is greater than an end-of-life value; and responsive to at least one current modeled age of the interconnect group being greater than the end-of-life value, send an indication to take corrective action with the at least one associated interconnect group such that at least one of the multi-core processor associated with the at least one interconnect group is replaced or workload associated with the core or the multi-core processor associated with the at least one interconnect group is managed.

14. The apparatus of claim 13, wherein the instructions further causes the processor to:

responsive to none of the current modeled age of the interconnect group for the set of interconnect groups being greater than or equal to the end-of-life value, repeat the process to calculate a new modeled age for each of the set of interconnect groups;

determine whether at least one of the new modeled age of the interconnect group for the set of interconnect groups is greater than the end-of-life value; and responsive to at least one new modeled age of the interconnect group being greater than the end-of-life value, send the indication to take corrective action with the at least one associated interconnect group.

15. The apparatus of claim 13, wherein the numerical values of the currents of core components are computed by multiplying a total current consumption of processors measured at a voltage regulator that are scaled by a ratio of total cores to a number of the running cores, by a numerically computed contribution of each of the core components to a total current consumed by each core.

16. The apparatus of claim 15, wherein the numerically computed contribution of each of the core components to the total current consumed by each core is computed using a pre-silicon power analysis of the distribution of dynamic and static currents, wherein the dynamic and static current components are scaled to a voltage, frequency, and temperature of the running cores, and wherein the leakage current component is further multiplied by the IDDQ current measurements for each individual processor chip.

17. The apparatus of claim 13, wherein the current contribution matrix is computed based on pre-silicon simulation of a processor power grid with current sources at specified locations, and wherein the current contribution matrix is computed for both static currents and dynamic currents.

18. The apparatus of claim 13, wherein the instructions further cause the processor to:

compute a failure in test (FIT) rate based upon the current modeled age of the interconnect group.

* * * * *